US 6,275,324 B1

(12) United States Patent
Sneh

(10) Patent No.: US 6,275,324 B1
(45) Date of Patent: Aug. 14, 2001

(54) MICROMACHINED TUNABLE OPTICAL FILTER WITH CONTROLLABLE FINESSE AND PASSBAND WAVELENGTH POSITION

(75) Inventor: Anat Sneh, Branchburg, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/211,184

(22) Filed: Dec. 14, 1998

(51) Int. Cl.[7] ............................ G02B 27/00; G02B 26/08; G02F 1/03
(52) U.S. Cl. ........................ 359/291; 359/292; 359/223; 359/224; 359/260
(58) Field of Search ............................ 359/251, 260, 359/259, 290, 291, 292, 318, 223, 224, 261, 263; 254/2

(56) References Cited

U.S. PATENT DOCUMENTS

| 5,550,373 | * | 8/1996 | Cole ................................. 250/338.1 |
| 5,739,945 | | 4/1998 | Tayebati ............................ 359/291 |

OTHER PUBLICATIONS

A. Spisser et al., "Highly Selective and Widely Tunable 1.55–μm InP/Air–Gap Micromachined Fabry–Perot Filter for Optical Communications," IEEE Photonics Technology Letters, vol. 10, No. 9, pp. 1259–1261, Sep. 1998.
M.C. Larson et al., "Broadly–Tunable Resonant–Cavity Light–Emitting Diode," IEEE Photonics Technology Letters, vol. 7, No. 11, pp. 1267–1269, Nov. 1995.
E.C. Vail et al., "GaAs Micromachined Widely Tunable Fabry–Perot Filters," Electronics Letters, vol. 31, No. 3, pp. 228–229, Feb. 1995.
P. Tayebati et al., "Widely Tunable Fabry–Perot Filter Using Ga(Al)As–AlO$_x$ Deformable Mirrors," IEEE Photonics Technology Letters, vol. 10, No. 3, pp. 394–396, Mar. 1998.
J. Peerlings et al., "Long Resonator Micromachined Tunable GaAs–AlAs Fabry–Perot Filter," IEEE Photonics Technology Letters, vol. 9, No. 9, pp. 1235–1237, Sep. 1997.
K.S.J. Pister et al., "Microfabricated Hinges," Sensors and Actuators A, vol. 33, pp. 249–256, 1992.

* cited by examiner

Primary Examiner—Georgia Epps
Assistant Examiner—Michael A Lucas
(74) Attorney, Agent, or Firm—Ryan, Mason & Lewis, LLP

(57) ABSTRACT

The invention provides tunable optical filters in which operating characteristics such as initial cavity length and mirror tilt, affecting passband wavelength position and filter finesse, respectively, can be controlled independently of membrane tuning bias. An illustrative embodiment incorporates a surface-micromachined plate with an opening in which a moveable frame is supported by, e.g., flexure bars or support arms. A moveable membrane with a high reflective (HR) coated mirror is supported in an opening in the moveable frame. The mirror defines one side of a Fabry-Perot (FP) filter cavity and is movable in a direction along an axis of the filter cavity. The other side of the filter cavity is defined by a second HR-coated mirror. The moveable frame has a number of electrodes arranged on a surface thereof, such that an operating characteristic of the filter, e.g., the cavity length affecting the passband wavelength position or the mirror tilt affecting the filter finesse, can be adjusted by applying signals to at least a subset of the electrodes. The use of a separate set of electrodes for controlling the moveable frame permits the operating characteristic to be adjusted independently of a tuning bias applied to one or more additional electrodes associated with the moveable membrane.

23 Claims, 4 Drawing Sheets

Si₃N₄  SiO₂  Poly 1  Poly 2  SACRIFICIAL LAYER

MICROMACHINED TUNABLE OPTICAL FILTER WITH CONTROLLABLE FINESSE AND PASSBAND WAVELENGTH POSITION

RELATED APPLICATION

The present application is related to U.S. patent application Ser. No. 09/211,185 of V. A. Aksyuk, D. J. Bishop and A. Sneh, entitled "Surface-Micromachined Out-of-Plane Tunable Optical Filter," and filed concurrently herewith.

FIELD OF THE INVENTION

The present invention relates generally to optical devices and more particularly to micromachined tunable optical filters and techniques for fabricating such filters.

BACKGROUND OF THE INVENTION

Tunable optical filters are useful devices for wavelength-division-multiplexing (WDM) systems, performing functions such as optical monitoring, channel selection in wavelength-based routing, noise filtering and coherent crosstalk reduction. As the number of wavelengths used in these systems grows, it is particularly desirable to have inexpensive tunable filters. Existing tunable filters have a relatively high unit cost, due to the labor-intensive fabrication and assembly processes which are used. Among these, tunable Fabry-Perot (FP) filters based on mechanical scanning of a FP cavity length are generally best suited to meet the high performance required in WDM systems, due to important optical properties such as, for example, low loss, polarization insensitivity, large tuning range and high bandwidth resolution. In addition to the problem of high cost, the tuning speed of bulk mechanical filters is typically rather slow, i.e., on the order of milliseconds, as the tuning process requires moving a relatively large mass.

A tunable FP filter is characterized by a cavity enclosed between two mirrors. The transmission function of a symmetric FP filter with identical mirrors is given by:

$$T = \frac{(1-R)^2}{(1-R)^2 + 4R\sin^2(\delta/2)} \quad (1)$$

where R is the mirrors' power reflectivity and $\delta$ is the accumulated phase a light wave acquires in each round-trip inside the cavity, given by:

$$\delta = \frac{4\pi n L}{\lambda} \quad (2)$$

Here, n is the index of refraction of the material comprising the cavity (n=1 for air), L is the cavity length, and $\lambda$ is the operating wavelength. The resonant wavelengths of this filter are determined by the phase $\delta$ given above, and the separation between the wavelengths, called the free-spectral-range (FSR), is given approximately by:

$$\Delta\lambda_{FSR} = \frac{\lambda^2}{2nL} \quad (3)$$

The passband width of the resonant peak is determined by the filter finesse F, which is a measure of the overall cavity and mirror losses:

$$\delta\lambda = \frac{\Delta\lambda_{FSR}}{F} \quad (4)$$

For an ideal lossless filter, the finesse is given by $F=\pi R/(1-R)$. The wavelengths that the filter transmits can be tuned, among other ways, by mechanically tuning the cavity length.

One type of conventional optimized tunable filter design approach sets the free spectral range to be about equal to the required tuning range. For WDM systems, a typical tuning range is in the range of 40–100 nm, and the center wavelength is approximately 1.55 $\mu$m. Using Eq. (3), this translates to a cavity length of 10–30 $\mu$m. If the WDM system uses 0.8 nm (100 GHz) channel spacing, a tunable filter used as a channel selector would require a filter bandwidth $\leq$0.5 nm, and from Eq. (4), a finesse of 80–200. This means that the required mirror reflectivity would be close to 98–99%.

In order to reduce cost substantially and also to enable faster switching speeds, micromachined FP filters have been developed. Examples of micromachined FP filters are described in M. C. Larson, and J. S. Harris Jr., "Broadly-tunable resonant-cavity light-emitting diode," IEEE Photon. Technol. Lett., Vol. 7, p. 1267, 1995; E. C. Vail et al., "GaAs micromachined widely tunable Fabry-Perot filters," Electron. Lett., Vol. 31, p. 228–229, 1995; P. Tayebati et al., "Widely tunable Fabry-Perot filter using Ga(Al)As-AlO$_x$ deformable mirrors," IEEE Photonic Technol. Lett., Vol. 10, pp. 394–396, 1998; J. Peerlings et al., "Long resonator micromachined tunable GaAs-AlAs Fabry-Perot filter," IEEE Photonic Technol. Lett., Vol. 9, pp. 1235–1237, 1997; A. Spisser et al., "Highly selective and widely tunable 1.55 $\mu$m InP/air-gap micromachined Fabry-Perot filter for optical communications," IEEE Photonic Technol. Lett., Vol. 10, pp. 1259–1261, 1998; and U.S. Pat. No. 5,739,945 issued to P. Tayebati and entitled "Electrically tunable optical filter utilizing a deformable multi-layer mirror."

These micromachined filters share a common design approach, which defines vertically the entire FP structure, including its cavity and mirrors, by a sequence of multi-layer thin-film depositions on a wafer substrate. In this design approach, both top and bottom cavity mirrors are typically comprised of several quarter-wave-thick layers with alternating high and low refractive indices, while the layer which is used to define the cavity is a sacrificial layer which is later etched away in one of the final processing steps. The etching process forms a membrane or a cantilever structure. Cavity tuning is obtained electrically by pulling the membrane or the cantilever toward the substrate with electrostatic force, which changes the cavity spacing between the mirrors. Other types of filter designs, including horizontal cavity designs, are also possible.

In a typical mechanically-scanned micromachined tunable FP filter, the initial separation of the mirrors, and hence the exact starting wavelength position, i.e., rest position, of the filter passband in a given channel wavelength grid, is usually arbitrary and unknown until the assembly of the filter is complete. This poses a significant problem for system designers since a fixed set of applied tuning biases will sweep the filter passband through a tuning range, and thus a channel wavelength grid, which can differ from one device to another. Other problems with existing mechanically-scanned tunable FP filters include difficulties in controlling filter finesse, and difficulties in correcting for finesse degradation or other deviations from initial conditions over the operating lifetime of a given device. A need therefore exists for an improved micromachined tunable optical filter in which initial cavity spacing can be controlled independently of the tuning bias control, and in which finesse, wavelength position and other filter parameters can be more accurately controlled over the lifetime of the device.

SUMMARY OF THE INVENTION

The present invention provides tunable micromachined optical filters in which operating characteristics such as initial cavity spacing and mirror tilt, affecting passband wavelength position and filter finesse, respectively, can be controlled independently of the tuning bias control. A tunable optical filter in accordance with an illustrative embodiment of the invention incorporates a surface-micromachined plate with an opening in which a moveable frame is supported by, e.g., flexure bars or support arms. A moveable membrane which includes a first high reflective (HR) coated mirror is supported in an opening in the moveable frame. The mirror defines one side of a Fabry-Perot (FP) filter cavity and is movable in a direction along an axis of the filter cavity. The other side of the filter cavity is defined by a second HR-coated mirror. The moveable frame has a number of electrodes arranged on a surface thereof, such that operating characteristics of the filter, such as the finesse or passband wavelength position, can be adjusted by applying signals to one or more of the electrodes. The use of a separate set of electrodes for controlling the moveable frame permits the operating characteristics to be adjusted independently of a tuning bias applied to one or more additional tuning electrodes associated with the moveable membrane.

The filter cavity of a tunable optical filter in accordance with the invention may be defined horizontally or vertically, depending on the configuration and arrangement of the second mirror relative to the first mirror. For example, the second mirror may be part of a second plate which is formed on the substrate, and subsequently released from the substrate and secured in another plane orthogonal to the plane of the substrate, such that the filter cavity is defined horizontally between the first and second mirrors. As another example, the second mirror may be formed on an endface of an external fiber, such that light from the fiber can pass from the second mirror through an opening in the second plate to the first mirror. The filter cavity in this embodiment is also defined horizontally, but between the first mirror of the first plate and the second mirror on the fiber endface. In another possible implementation, the second plate is eliminated and the second mirror is formed on the substrate. The first plate is then arranged over the second mirror, in a plane parallel to the plane of the substrate, and separated from the substrate by spacers, such that the filter cavity is defined vertically. The cavity length is determined initially by the spacers, which can be defined using various techniques. As yet another example, the filter cavity of a tunable optical filter in accordance with the invention can be formed using a standard vertical cavity technique, such as is described in the above-cited references, in which no spacers are used and the membrane remains in the plane in which it is originally formed.

The invention in the illustrative embodiment provides a separate set of electrodes that can, e.g., control the initial cavity spacing of a micromachined tunable optical filter independently of the tuning bias control. This separate electrode set can also be configured to provide a simple, and possibly automated, technique to control the filter finesse by, e.g., adjusting the tilt of the mirrors with respect to one another. A tunable optical filter configured in accordance with the invention substantially reduces the manual labor costs typically associated with filter assembly. The invention also provides the ability to correct for finesse degradation or other deviation from initial conditions over the lifetime of the filter.

DETAILED DESCRIPTION OF THE INVENTION

Figure 1:
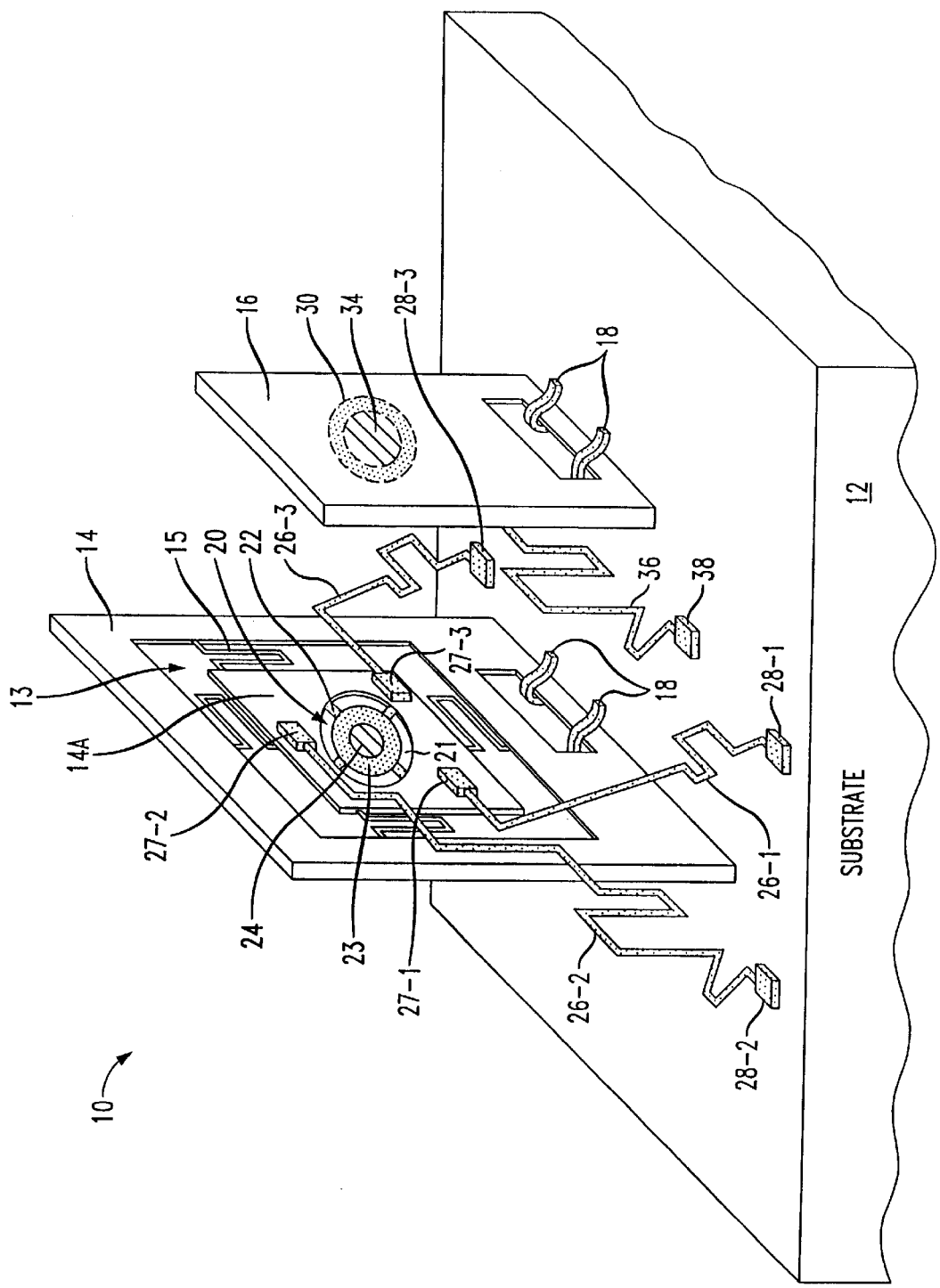
FIG. 1 shows an illustrative embodiment of a micromachined tunable optical filter in accordance with the invention, in a horizontal cavity configuration with two plates each supporting a mirror.

FIG. 1 shows a horizontal cavity tunable FP optical filter 10 in accordance with an illustrative embodiment of the invention. The filter 10 includes a substrate 12 and a pair of plates 14, 16. The plate 14 includes an inner frame 14A supported in an opening 13 in plate 14 by a number of flexure bars 15. The plates 14, 16 are free to rotate around a fixed axis after their release from the substrate 12, but remain secured thereto by microhinges 18. The plates 14, 16 are shown in FIG. 1 as "flipped" out of the plane of the substrate 12, i.e., as out-of-plane plates fixed at an orthogonal position relative to the plane of the substrate. In other words, each of the plates 14, 16 is arranged in a plane which is at a 90° angle relative to the plane of the substrate. The plate 14 includes a moveable membrane 20 which is supported in a circular opening 21 of the inner frame 14A by a number of flexible support arms 22. The portion of the membrane 20 which is visible in FIG. 1 includes a membrane electrode 23 and a high reflective (HR) coated mirror 24.

Contact arms 26-1, 26-2 and 26-3 connect respective electrodes 27-1, 27-2 and 27-3 the inner frame 14A to corresponding contact pads 28-1, 28-2 and 28-3 on the substrate 12. The electrodes 27-1, 27-2 and 27-3 on inner plate 14A should generally be electrically insulated from one another. Such electrical insulation can be provided by, e.g., incorporating a suitably-configured electrically insulating layer, such as a layer of the frame and the electrodes. Although not illustrated in FIG. 1, one or more additional contact transfer arms may be used to connect membrane electrode 23 to a corresponding contact pad or set of contact pads formed on the substrate 12. The plate 16 includes a plate electrode 30 and an HR-coated mirror 34, both formed on a surface of the plate 16 which faces the plate 14. The plate electrode 30 and mirror 34 are shown in dashed outline since they are not directly visible in the perspective view of FIG. 1. The electrode 30 is coupled via a contact transfer arm 36 to a contact pad 38 formed on the substrate 12.

An FP filter cavity is defined in filter 10 horizontally between the two mirrors 24, 34 associated with the respective out-of-plane plates 14, 16. The mirror 24 covers an optical window through the plate 14. It should be noted that the term "optical window" as used herein refers generally to an area through which light can pass without large loss, and does not have to include an opening in the plate. In the FIG. 1 embodiment, each of the plates 14, 16 includes an optical window, and the mirror area of each plate is always greater than or equal to the corresponding optical window area. The membrane 20, and thus the mirror 24, is free to move along the horizontal axis of the filter cavity to provide tunability.

The inner frame 14A is free to move along several axes, e.g., it can tilt in various directions, and can shift in a horizontal direction, i.e., along an axis of the horizontal cavity. The inner frame 14A thus provides the filter 10 with additional tunability and functionality beyond that found in the conventional devices previously described. The actuation of the inner frame 14A is provided electrostatically by a separate set of electrodes, i.e., electrodes 27-1, 27-2 and 27-3, than the electrode or electrodes used for actuation of the membrane 20. The electrodes 27-1, 27-2 and 27-3 are examples of finesse/wavelength position control electrodes in accordance with the invention. These electrodes can be used, e.g., to control operating characteristics such as initial cavity spacing and mirror tilt, affecting passband wavelength position and filter finesse, respectively, independently of the tuning bias control of membrane 20.

As the inner frame 14A moves, the supported membrane 20 used for wavelength tuning may be configured to move rigidly with the frame. The tilt of the mirror 14 may be adjusted by applying different voltages to each of the electrodes 27-1, 27-2 and 27-3. Once a high finesse situation, e.g., substantially parallel mirrors, is achieved, the rest wavelength position, i.e., the wavelength position with no tuning bias, of the filter passband can be manipulated by applying a similar additional bias to all of the electrodes 27-1, 27-2 and 27-3, which causes the inner frame 14A to shift along the horizontal cavity axis. When a suitable position is reached, the inner frame position can be permanently fixed, or it can be actively controlled to maintain a fixed position using conventional electrical feedback control circuitry. Tuning of the filter passband away from its rest point may be obtained in a conventional manner, e.g., by actuating the membrane 20 longitudinally along the axis of the cavity using membrane electrode 23.

Figure 2:
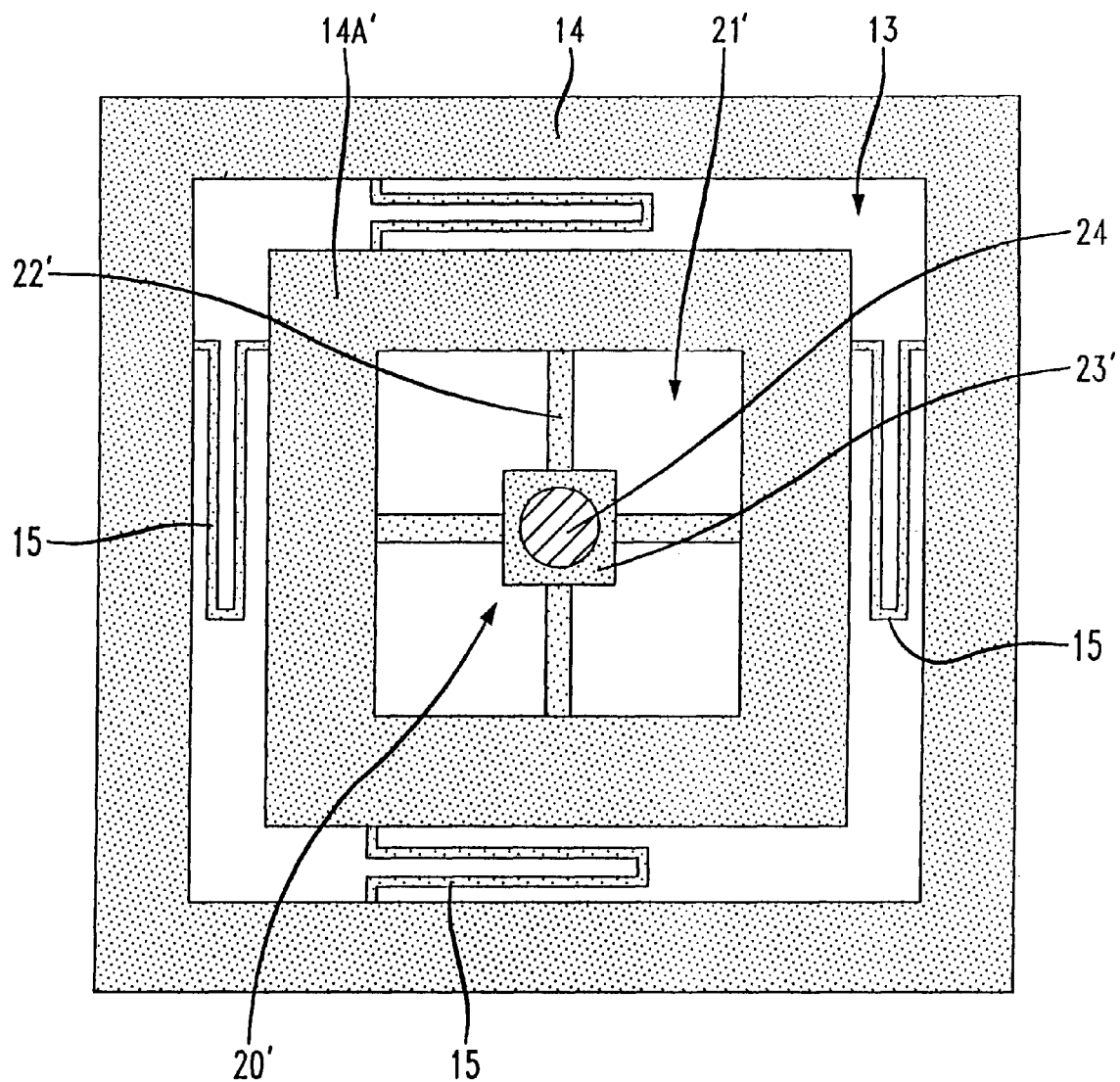
FIG. 2 shows an illustrative embodiment of a plate with a moveable frame in accordance with the invention, suitable for use in the tunable optical filter of FIG. 1 and in a variety of other tunable filter configurations.

FIG. 2 shows a more detailed view of an exemplary implementation of a plate with a moveable frame in accordance with the invention. It should be understood that the different implementations of the plate 14 as shown in FIGS. 1 and 2, as well as a wide variety of other variants, can each be used in many different filter configurations, including vertical cavity configurations. In the FIG. 2 implementation, the plate 14 includes opening 13 in which an inner frame 14A' is supported by the flexure bars 15. The inner frame 14A' includes a square opening 21' in which a moveable membrane 20' is supported by flexible support arms 22'. The membrane 20' includes a membrane electrode 23' and mirror 24. The elements 14A', 20', 21', 22' and 23' correspond to elements 14A, 20, 21, 22 and 23 of FIG. 1, but are altered in shape or arrangement in the FIG. 2 implementation. The membrane 20' is suspended from the inner plate 14A', and in this embodiment is free to move in a direction along a horizontal axis of the filter cavity. The inner plate 14A' itself is free to move along the horizontal axis of the filter cavity, and is also free to move in other directions, in accordance with the voltages applied to its electrodes. As is apparent from the illustrative implementations of FIGS. 1 and 2, the actual size, shape and other characteristics of the plate 14 and its associated elements, e.g., membrane, inner frame, supporting arms and flexures, etc., may vary according to the desired design, application and other factors.

In operation, light passes into and out of the filter 10 through one or more optical fibers, which are not shown in FIG. 1. For example, a first fiber may be arranged on the left side of the plate 14 with an end aligned with the mirror 24, and a second fiber may be arranged on the right side of plate 16 with an end aligned with the mirror 34. In such an arrangement, light from the first fiber may be incident on the mirror 24 through the optical window covered by the mirror 24, and light from the second fiber may be incident on the mirror 34 through the optical window of the plate 16. In other embodiments, a single fiber may be used both to introduce light into and remove light from the filter 10. The one or more fibers may be secured to the substrate or other surface of the filter 10 using conventional techniques. In this embodiment, light propagation is in directions substantially parallel to the substrate 12.

As previously noted, actuation of the membrane 20 and its corresponding mirror 24 in the filter 10 may be achieved electrostatically in this embodiment. As a bias voltage is applied between the membrane electrode 23 associated with plate 14 and the facing electrode 30 formed on the plate 16, via the respective contact pads and corresponding contact transfer arms, the membrane 20 and its mirror 24 are pulled toward the plate 16, thus changing the cavity length in accordance with the applied bias level. This in turn tunes the transmission peaks of the filter 10 to varying wavelength positions. In other embodiments, magnetic actuation may be used to displace the membrane 20 and its mirror 24. Magnetic actuation can be implemented, for example, by integrating coils around a membrane which is coated with a magnetic material, such that a current applied to the coils produces a magnetic field which exerts a force that causes the membrane to deflect.

In the embodiment of FIG. 1, the substrate 12 may be formed from materials that are suitable for micromachining techniques. Such materials include semiconductors such as silicon, gallium arsenide or indium phosphide, dielectrics such as glass or quartz, or metals. Silicon is a preferred material for applications requiring particularly low cost manufacturing. The plate or plates in these embodiments can be flipped out of the plane of the substrate by various techniques, preferably using the microhinges 18. The operation of the microhinges is described in greater detail in K. S. J. Pister et al., "Microfabricated hinges," Sens. and Actuators A, Vol. 33, p. 249–256, 1992, which is incorporated by reference herein. The action of bringing a plate to its out-of-plane position can be obtained manually, e.g., by manipulating the plates with micro-probes, or by self-assembly techniques. The latter may include techniques such as using microactuators to push the plate out of the substrate plane, or pushing the plate with the bending moment provided in stressed auxiliary plates upon their release, as described in U.S. patent application Ser. No. 08/997,175, filed in the name of inventors V. Aksyuk and D. J. Bishop, and entitled "Self-assembling micro-mechanical device." The microhinges 18 may be replaced with or used in combination with flexure bars connected to the plate. Such flexure bars can be configured to cause the plate to flip out of the substrate plane when an external force is applied to deform or flex the bars by techniques such as those noted above.

The HR-coated mirrors 24, 34 in the embodiment of FIG. 1 may be comprised of, e.g., one or more layers of dielectric materials or metals. Preferably the mirrors 24, 34 comprise a stack of dielectric layers with alternating high and low refractive index to achieve high reflectivity and low loss. If silicon is used as a substrate, the preferred mirror stack is silicon (which may include polysilicon) and silicon dioxide high/low index pairs. The mirror layers may be deposited on the substrate or on top of the structural and sacrificial layers which are used to define the plates and other related structures. These mirror layers can be deposited before the release process, i.e., the release of the plate 14 from the substrate 12 and the release of all other structures that require release from the substrate 12, in which case the mirror layers should be encapsulated in a way that will prevent their erosion during the etching process of the sacrificial layers for release of the plate 14. The mirror layers may also be deposited after the release process is completed. In either case, stress-relief techniques may be used to prevent bowing or warping of the membrane surface following the mirror coating deposition and release of the membrane. Such techniques may include relieving the stress in the mirror coating only, or balancing the coating stress by depositing additional films on the supporting structural layers. Built-in stress and the resulting mirror bowing may actually be used to focus the optical beam inside the FP resonator and to form a confocal cavity structure, as described in, e.g., A. Yariv, "Optical Electronics," 3rd Ed., Chapter 4, Holt-Saunders: New York, 1985, which is incorporated by reference herein.

The plate 14 with the moveable membrane 20 in the embodiment of FIG. 1 may consist of one or more layers, and its shape and size may vary according to the desired design and application. The optical window covered by the mirror 24 should generally be at least as large as the optical beam area that illuminates the FP filter. For a collimated beam, this may be a circular area with a diameter varying anywhere from few tens of microns to few millimeters. A non-collimated beam may also be used, and such a beam may mode fiber, expanded mode fiber or a multimode fiber. The corresponding optical window size is generally between a few microns to a few tens of microns.

The filter cavity of a tunable optical filter in accordance with the invention may be defined horizontally or vertically, depending on the configuration and arrangement of the second mirror relative to the first mirror. For example, as illustrated in the embodiment of FIG. 1, the second mirror may be part of a second plate which is formed on the substrate, and subsequently released from the substrate and secured in another plane orthogonal to the plane of the substrate, such that the filter cavity is defined horizontally between the first and second mirrors. As another example, the second mirror may be formed on an endface of an external fiber, such that light from the fiber can pass from the second mirror through an opening in the second plate to the first mirror. The filter cavity in this embodiment is also defined horizontally, but between the first mirror of the first plate and the second mirror on the fiber endface. In another possible implementation, the second plate is eliminated and the second mirror is formed on the substrate. The first plate is then arranged over the second mirror, in a plane parallel to the plane of the substrate, and separated from the substrate by spacers, such that the filter cavity is defined vertically. The cavity length is determined initially by the spacers, which can be defined using various techniques. Additional details regarding these and other possible implementations of tunable optical filters can be found in the above-cited U.S. patent application Ser. No. 09/211,185 of V. A. Aksyuk, D. J. Bishop and A. Sneh. As another example, the filter cavity of a tunable optical filter in accordance with the invention can be formed using a standard vertical cavity technique, such as is described in the above-cited references, in which no spacers are used and the membrane remains in the plane in which it is originally formed.

FIGS. 3(a) through 3(e) show an exemplary processing sequence for fabricating the inner plate electrodes in the filter of FIG. 1. This processing sequence makes use of a well-established surface micromachining process described in, e.g., D. A. Koester et al., "Multi-user MEMS process (MUPS) introduction and design rules," Rev. 4, Microelectronics Center of North Carolina (MCNC) MEMS Technology Applications Center: Research Triangle Park, N.C., 1996, which is incorporated by reference herein. Other MEMS (Microelectromechanical Systems) fabrication processes may also be used to form tunable optical filters in accordance with the invention, such as those processes described in, e.g., M. Madou, "Fundamentals of Microfabrication," CRC Press: Boca Raton, Fla., 1997, which is incorporated by reference herein.

Figure 3A:
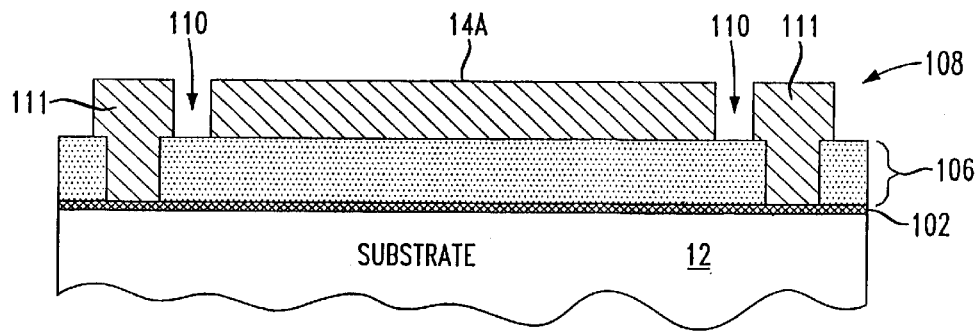
FIGS. 3(a) through 3(e) illustrate the steps of an exemplary fabrication process for a moveable frame portion of a plate in a tunable optical filter in accordance with the invention.
Figure 3B:
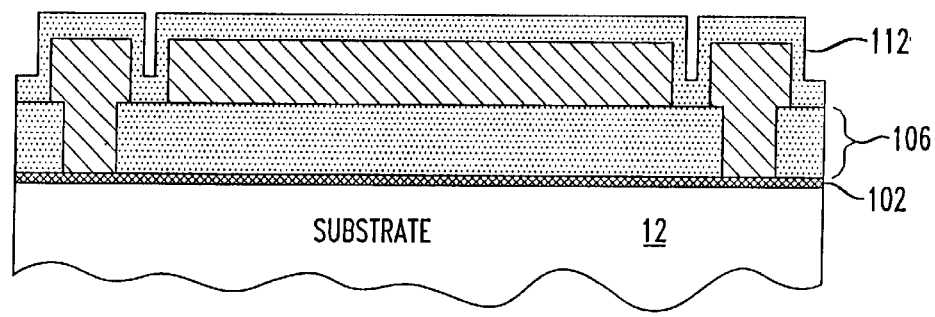
Figure 3C:
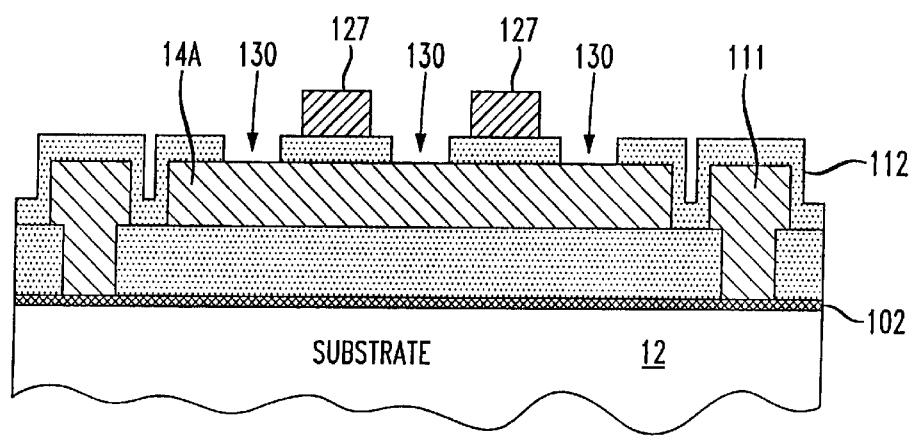

Referring to FIG. 3(a), a silicon nitride ($Si_3N_4$) layer 102 is formed on the substrate 12 to provide electrical isolation between the substrate 12 and overlying subsequently-formed structural polysilicon layers. A first layer of structural polysilicon (Poly1) 108 is deposited on top of a first sacrificial oxide ($SiO_2$) layer 106 formed over the silicon nitride layer 102. Opening holes 110 are patterned through the Poly1 layer 108 using hard mask lithography, as described in, e.g., the above-cited D. A. Koester et al. reference. The portions of the Poly1 layer 108 between the holes 110 corresponds to the structural layer of the inner frame 14A. The portions 111 of the Poly1 layer 108 serve to anchor the inner frame structure to the substrate 12. As shown in FIG. 3(b), a second sacrificial oxide layer 112 is deposited on top of the patterned Poly1 layer 108. A second polysilicon layer (Poly2) is then deposited over the sacrificial oxide layer 112. As shown in FIG. 3(c), the Poly2 layer is then patterned and used as a conducting surface for electrodes 127. Although not shown, metal contacts, e.g., gold contacts, may be subsequently added on top of the Poly2 electrodes 127.

Figure 3D:
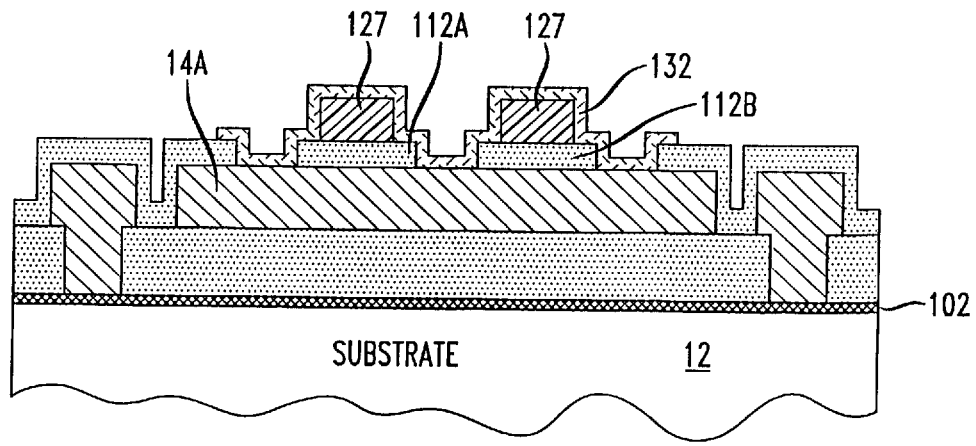

At this point in the fabrication process, all of the structural layers have been defined using standard processing as described in the D. A. Koester et al. reference, and additional processing steps are then performed to complete the electrode formation. Openings 130 in the second oxide layer 112 are etched down to the Poly1 layer 108 around the edges of the Poly2 electrodes 127, as shown in FIG. 3(c). The openings 130 are then filled with an additional deposited sacrificial layer 132 as shown in FIG. 3(d). This sacrificial layer 132 may be, for example, a polymer such as photoresist or polyimide, or various metals. The frame 14A is released from the substrate 12 by first etching away the sacrificial oxide layers 106 and 112. During this etching, the additional deposited sacrificial layer 132 prevents erosion of the oxide areas 112A and 112B under the electrodes 127. These remaining oxide areas provide the desired electrical isolation between the Poly2 electrodes 127 by insulating the Poly1 structural layer 108 of the frame from the Poly2 electrodes 127.

Figure 3E:
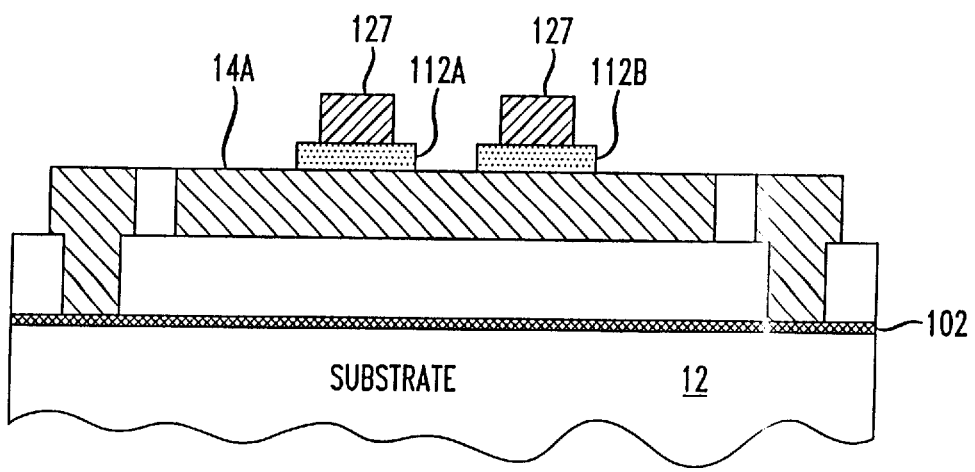

The electrode formation process is completed by removing the last sacrificial layer 132 with a suitable etching process, resulting in the inner frame structure shown in FIG. 3(e). It is assumed that the sectional view of FIG. 3(e) is taken such that the plate 14, flexure bars 15, membrane 20 and other elements associated with the inner frame are not visible, although at least a subset of these elements could be at least partially formed using the same processing steps described above.

It should be noted that in an alternative embodiment of the invention, the finesse/wavelength position control electrodes may be placed on a stationary plate, e.g., on plate 16 in the filter 10 of FIG. 1, opposite the plate containing the inner frame structure. In such an embodiment, the surface of the inner frame contained in the non-stationary plate, e.g., plate 14, should be electrically continuous and used as a common plane. Other embodiments of the invention may be configured utilizing vertical cavity arrangements such as that described in the above-cited references or in the above-cited U.S. patent application Ser. No. 09/211,185 of V. A. Aksyuk, D. J. Bishop and A. Sneh. In a vertical cavity embodiment of the invention, the stationary "plate" portion of the filter may be comprised of layers deposited, epitaxially grown or otherwise formed directly on the substrate. In this case, the finesse/wavelength position control electrodes may also be formed on the substrate. Standard MCNC processing techniques can be used to provide electrical isolation between the contacts.

The invention has been described above in conjunction with a number of exemplary tunable optical filter configurations. However, it should be understood that the invention is not limited to use with the particular configurations shown. For example, the processing operations of FIGS. 3(a) to 3(e) are shown by way of example only, and many other types of processing operations may be used to produce frames and other elements of tunable optical filters in accordance with the invention. These and numerous other alternative embodiments within the scope of the following claims will be apparent to those skilled in the art.

What is claimed is:

1. A tunable optical filter comprising:

a substrate; and a first plate attached to the substrate, the first plate having an opening therein in which a moveable frame is supported, the moveable frame having an opening therein in which a first mirror is supported, wherein the first mirror defines one side of a filter cavity and is movable in a direction along an axis of the filter cavity, and further wherein the other side of the filter cavity is defined by a second mirror.

2. The tunable optical filter of claim 1 wherein the filter is a Fabry-Perot filter.

3. The tunable optical filter of claim 1 wherein the moveable frame has a plurality of electrodes arranged on a surface thereof, such that an operating characteristic of the filter can be adjusted by applying signals to at least a subset of the electrodes.

4. The tunable optical filter of claim 3 wherein electrodes on the surface of the moveable frame permit the operating characteristic to be adjusted independently of a tuning bias applied to one or more additional electrodes associated with the first mirror.

5. The tunable optical filter of claim 3 wherein the operating characteristic includes a cavity length of the filter.

6. The tunable optical filter of claim 3 wherein the operating characteristic includes a tilt of the first mirror.

7. The tunable optical filter of claim 1 wherein the first plate is formed on the substrate and subsequently at least partially released from the substrate and arranged in a plane other than that in which it was formed.

8. The tunable optical filter of claim 1 wherein the second mirror defining the other side of the filter cavity is formed on a second plate which is formed on the substrate and subsequently at least partially released from the substrate and arranged in a plane other than that in which it was formed.

9. The tunable optical filter of claim 1 wherein the mirror is formed as part of a moveable membrane supported in the opening in the moveable frame, such that the membrane is moveable in the direction along the axis of the filter cavity.

10. A method of forming a tunable optical filter, the method comprising the steps of:

arranging a moveable frame in an opening in a first plate attached to a substrate; and arranging a first mirror in an opening in the moveable frame, wherein the first mirror defines one side of a filter cavity and is movable in a direction along an axis of the filter cavity, and further wherein the other side of the filter cavity is defined by a second mirror.

11. The method of claim 10 further including the step of arranging the first plate in a plane which is substantially orthogonal to a plane of the substrate.

12. The method of claim 10 further including the step of arranging a plurality of electrodes on a surface of the moveable frame, such that an operating characteristic of the filter can be adjusted by applying signals to at least a subset of the electrodes.

13. The method of claim 12 wherein the electrodes on the surface of the moveable frame permit the operating characteristic to be adjusted independently of a tuning bias applied to one or more additional electrodes associated with the first mirror.

14. The method of claim 12 wherein the operating characteristic includes a cavity length of the filter.

15. The method of claim 12 wherein the operating characteristic includes a tilt of the first mirror.

16. The method of claim 10 further including the steps of:

forming the first plate on the substrate;

at least partially releasing the first plate from the substrate; and arranging the at least partially released first plate in a plane other than that in which it was formed.

17. The method of claim 10 further including the steps of:

forming a second plate on the substrate such that the second mirror is formed on the second plate;

at least partially releasing the second plate from the substrate; and arranging the at least partially released second plate in a plane other than that in which it was formed.

18. The method of claim 10 further including the step of forming the first mirror as part of a movable membrane supported in the opening in the moveable frame, such that the membrane is moveable in the direction along an axis of the filter cavity.

19. An optical filter comprising:

a substrate;

a first plate attached to the substrate and having an opening therethrough;

a moveable frame supported in the opening in the first plate and having an opening therethrough;

a first mirror supported in the opening in the moveable frame; and a second mirror arranged relative to the first mirror such that the first and second mirrors define opposite sides of a filter cavity.

20. The optical filter of claim 19 wherein the moveable frame has a plurality of electrodes arranged on a surface thereof, such that an operating characteristic of the filter can be adjusted by applying signals to at least a subset of the electrodes.

21. The optical filter of claim 20 wherein the electrodes on the surface of the moveable frame permit the operating characteristic to be adjusted independently of a tuning bias applied to one or more additional electrodes associated with the first mirror.

22. The optical filter of claim 20 wherein the operating characteristic includes a cavity length of the filter.

23. The optical filter of claim 20 wherein the operating characteristic includes a tilt of the first mirror.

* * * * *